United States Patent
Sapio et al.

(10) Patent No.: US 9,860,882 B2
(45) Date of Patent: Jan. 2, 2018

(54) VARIABLE DOWNLINK-UPLINK BOUNDARY

(71) Applicant: Link Labs, LLC, Annapolis, MD (US)

(72) Inventors: Adrian Sapio, Mount Airy, MD (US); Richard Kevin Sawyer, Jr., University Park, MD (US); Allen Parker Welkie, Columbia, MD (US); Ricardo Luna, Jr., Las Cruces, NM (US)

(73) Assignee: LINK LABS, INC., Annapolis, MD (US)

( * ) Notice: Subject to any disclaimer, the term of this patent is extended or adjusted under 35 U.S.C. 154(b) by 165 days.

(21) Appl. No.: 14/929,766

(22) Filed: Nov. 2, 2015

(65) Prior Publication Data

US 2017/0127403 A1 May 4, 2017

(51) Int. Cl.
*H04W 72/04* (2009.01)
*H04L 5/16* (2006.01)

(52) U.S. Cl.
CPC .......... *H04W 72/0413* (2013.01); *H04L 5/16* (2013.01); *H04W 72/042* (2013.01); *H04W 72/0446* (2013.01)

(58) Field of Classification Search
CPC .. H04L 5/16; H04W 72/0413; H04W 72/042; H04W 72/0446
See application file for complete search history.

(56) References Cited

U.S. PATENT DOCUMENTS

| | | | |
|---|---|---|---|
| 5,689,502 A | 11/1997 | Scott | |
| 5,802,046 A | 9/1998 | Scott | |
| 6,094,421 A | 7/2000 | Scott | |
| 6,108,369 A * | 8/2000 | Ovesjo | H04B 7/264 375/146 |
| 7,092,353 B2 | 8/2006 | Laroia et al. | |
| 8,305,972 B2 | 11/2012 | Baker et al. | |
| 8,326,309 B2 | 12/2012 | Mody et al. | |
| 2005/0174971 A1 * | 8/2005 | Lenzini | H04W 72/1257 370/336 |
| 2011/0110340 A1 * | 5/2011 | Lakkis | H04W 74/08 370/336 |
| 2013/0035084 A1 * | 2/2013 | Song | H04W 74/0833 455/418 |
| 2013/0315114 A1 | 11/2013 | Seo et al. | |
| 2014/0185539 A1 | 7/2014 | Seo et al. | |
| 2014/0376433 A1 * | 12/2014 | Li | H04W 52/0209 370/311 |

(Continued)

*Primary Examiner* — Habte Mered
(74) *Attorney, Agent, or Firm* — Charles B. Lobsenz; Brian H. Buck; Potomac Law Group, PLLC

(57) ABSTRACT

A method of operating an end node to communicate with a central node, the method comprising: wirelessly receiving, a beacon signal periodically-transmitted from the central node; each beacon signal denoting the start of a single frame; each frame being organized to include a downlink (DL) phase which precedes an uplink (UL) phase; and a payload of the beacon signal including an offset which represents a starting time of the UL phase. The method further comprises: generating a message; selecting, unbeknownst to the central node, at least one UL logical-channel, respectively; and wirelessly transmitting, during the UL phase, at least a portion of the message from the end node over the selected at least one UL logical-channel according to a slotted ALOHA technique.

26 Claims, 5 Drawing Sheets

(56) References Cited

U.S. PATENT DOCUMENTS

2015/0117364 A1* 4/2015 Asterjadhi .............. H04L 5/003
                                                                370/329
2016/0261306 A1* 9/2016 Seller ................ H04W 56/0015

* cited by examiner

VARIABLE DOWNLINK-UPLINK BOUNDARY

FIELD OF THE DISCLOSURE

Embodiments of the present invention relate to methods and apparatus for operating one of a plurality of end nodes to wirelessly communicate with a central node over an unlicensed spectrum, and for operating a central node to wirelessly communicate with instances of the end node over the unlicensed spectrum.

BACKGROUND

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," *RFID Journal*, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Examples of low-power, low-bandwidth wireless networks include those compliant with the IEEE 802.15.4 standard, the "Zigbee protocol," the 6LoWPAN standard, the LoRaWAN standard (as standardized by the LoRa™ Alliance), etc. Such networks are described as comprising the Wireless Embedded Internet ("WET"), which is a subset of IoT.

Most of the WET operates in portions of the RF spectrum that are unlicensed by a government's regulatory authority. Examples of unlicensed spectrums include the industrial, scientific and medical (ISM) radio bands reserved internationally for the use of radio frequency (RF) energy for industrial, scientific and medical purposes other than telecommunications, e.g., as regulated in the U.S.A. by FCC Part 15, with such regulations including requirements/constraints on frequency hopping, etc. An example of a telecommunications technique used in the 915 MHz ISM band is the LoRa™ modulation format that is included in the LoRaWAN standard. The LoRa™ modulation format can be described as a frequency modulated ("FM") chirp that is based on the generation of a stable chirp using a fractional-N ("fracN") phase-locked loop ("PLL"). Core LoRa™ technology is described in U.S. Pat. No. 7,791,415, which is assigned to Semtech™ Corporation. It is noted that the LoRa™ modulation format does not itself describe system functionality above the physical layer, i.e., above the RF medium.

It was assumed that Moore's law would advance computing and communication capabilities so rapidly that soon any embedded device could implement IP protocols, even the embedded, low-power, wireless devices of the WET. Alas, this has not proven true for cheap, low-power microcontrollers and low-power wireless radio technologies. The vast majority of simple embedded devices still make use of 8-bit and 16-bit microcontrollers with very limited memory because they are low-power, small and cheap.

Consequently, most of the WET includes resource-limited embedded devices, which typically are battery powered. The physical trade-offs of wireless technology have resulted in most of the WET using short-range, low-power wireless radios which have limited data rates (and consequently limited spreading factors), frame sizes and duty cycles.

Most wireless data networks must deal with the problem of an imperfect transmission channel. Because the transmission channel can vary with time, among some wireless networks, it is known to adaptively set one or the transmission settings, respectively.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of operating an end node to communicate with a central node, the method comprising: wirelessly receiving, a beacon signal periodically-transmitted from the central node; each beacon signal denoting the start of a single frame; each frame being organized to include a downlink (DL) phase which precedes an uplink (UL) phase; and a payload of the beacon signal including an offset which represents a starting time of the UL phase. The method further comprises: generating a message; selecting, unbeknownst to the central node, at least one UL logical-channel, respectively; and wirelessly transmitting, during the UL phase, at least a portion of the message from the end node over the selected at least one UL logical-channel according to a slotted ALOHA technique.

Another aspect of the present invention provides an end node configured to communicate with a central node, the end node comprising: a wireless unit configured to receive and transmit messages, respectively; and a wireless interface configured to receive, via the wireless unit, a beacon signal periodically-transmitted from the central node; each beacon signal denoting the start of a single frame; each frame being organized to include a downlink (DL) phase which precedes an uplink (UL) phase; and a payload of the beacon signal including an offset which represents a starting time of the UL phase. The end node further comprises: a message generator configured to generate a message; and an LC selector configured to select, unbeknownst to the central node, at least one UL logical-channel, respectively; the wireless interface being further configured to transmit, during the UL phase, at least a portion of the message over the selected at least one UL logical channel according to a slotted ALOHA technique.

Yet another aspect of the present invention provides a method of operating a central node to wirelessly communicate with an end node, the method comprising: generating periodically a beacon signal; each beacon signal denoting the start of a single frame; and each frame being organized to include a downlink (DL) phase which precedes an uplink (UL) phase; adaptively determining a duration of the DL phase and a start of the UL phase; configuring the beacon signal with a payload which includes: an offset indicating when the UL phase will begin; wirelessly transmitting periodically the beacon signal; awaiting a start of the UL phase based on the offset; and wirelessly listening, beginning at the UL phase-start, as follows: on each of M*N UL logical-channels resulting from a predefined first group of M physical-channels, respectively, and a predefined second group of N orthogonal spreading factors usable on each physical-channel, respectively; and for one or more messages transmitted from the end node, respectively, according to a slotted ALOHA technique; wherein M and N are non-zero, positive integers, respectively.

Yet another aspect of the present invention provides a central node configured to configured to wirelessly communicate with an end node, the central node comprising: a wireless unit configured to at least receive and transmit messages, respectively; a beacon-signal generator configured to generate periodically a non-hopping beacon signal; each beacon signal denoting the start of a single frame; each frame being organized to include a downlink (DL) phase which precedes an uplink (UL) phase; a time-boundary unit configured to adaptively determine a duration of the DL phase and a start of the UL phase; the beacon-signal generator being further configured to include, in a payload of the beacon signal, an offset indicating when the UL phase will begin; a wireless interface configured to transmit periodically, via the wireless unit, the beacon signal; a timer configured to elapse a delay time based on the offset and thereby then indicate a start of the UL phase; the wireless interface being further configured to listen, via the wireless unit and beginning at the UL phase-start, as follows: on each of M*N UL logical-channels resulting from a predefined first group of M physical-channels, respectively, and a predefined second group of N orthogonal spreading factors usable on each physical-channel, respectively; and for one or more messages transmitted from the end node, respectively, according to a slotted ALOHA technique; wherein M and N are non-zero, positive integers, respectively.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1A:
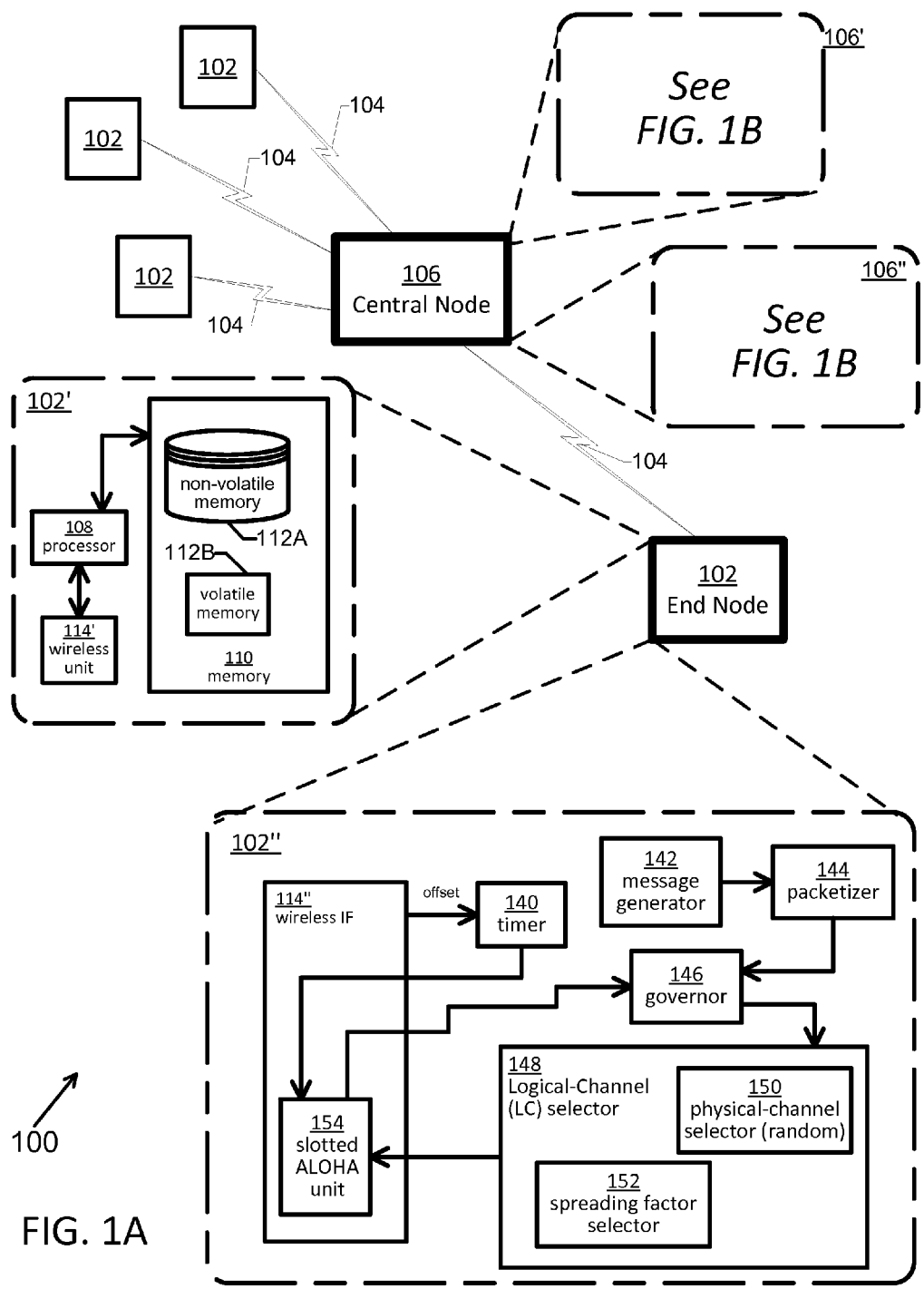
FIGS. 1A-1B are block diagrams of wireless network, for example, a long-range, low-power network, according to an embodiment of the present invention, wherein FIG. 1A emphasizes physical unit and functional unit configurations of the end node, and FIG. 1B emphasizes physical unit and functional unit configurations of the central node.

Embodiments of the present invention will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/ communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

Figure 1B:
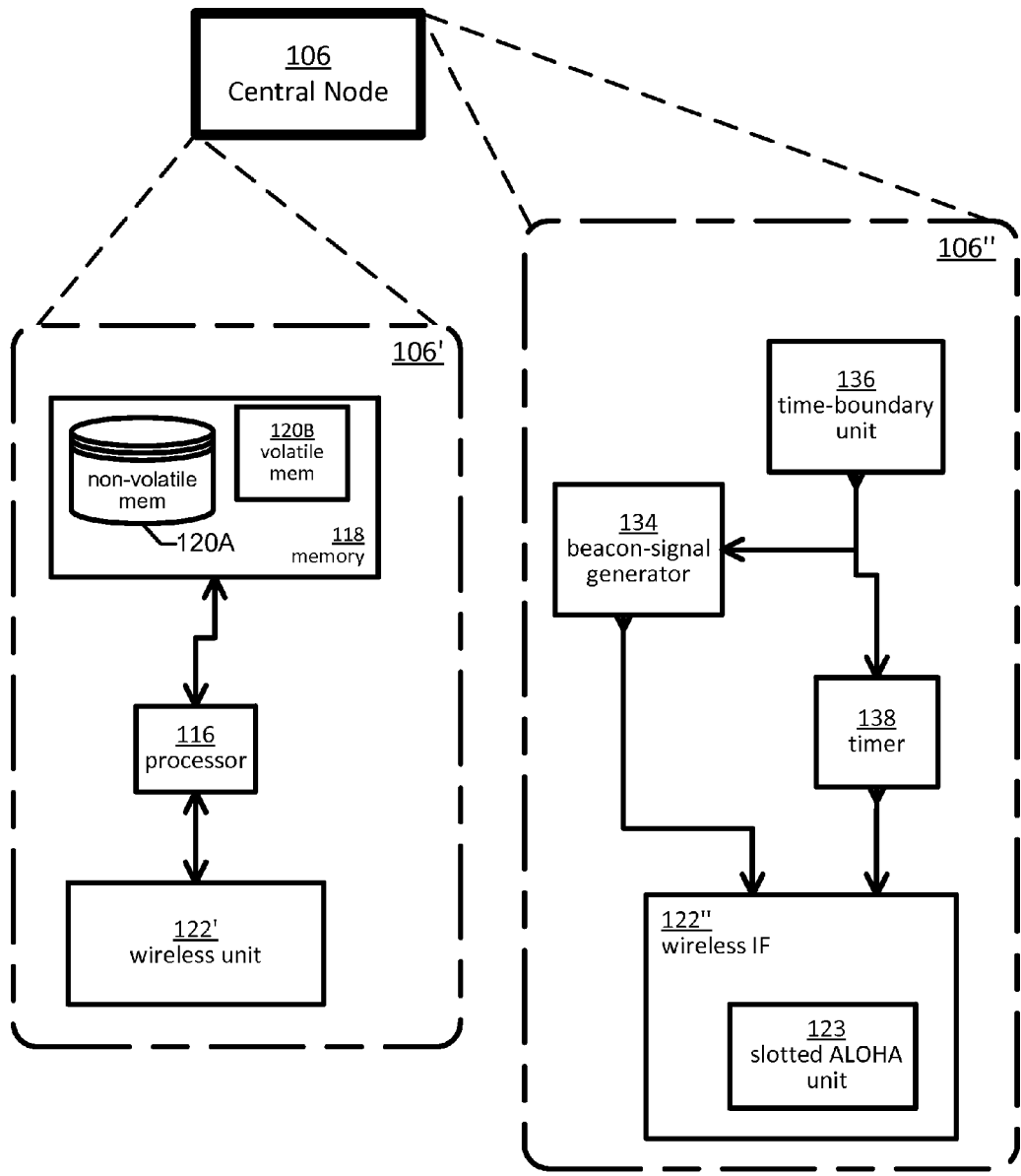

FIGS. 1A-1B are block diagrams of wireless network 100, for example, a long-range, low-power network, according to an embodiment of the present invention, wherein FIG. 1A emphasizes physical unit and functional unit configurations of end node 102, and FIG. 1B emphasizes physical unit and functional unit configurations of central node 106.

In FIG. 1A, wireless network 100 can be compatible with a variety of modulation formats and is well suited, for example, to modulation formats which are susceptible to destructive interference (sometimes referred to as collisions) when two or more nodes attempt to transmit on the same logical channel, e.g., the LoRa™ modulation format, etc. For purposes of a more detailed discussion, at the physical layer, it will be assumed that wireless network 100 is compatible with the LoRa™ modulation format.

Network 100 includes: instances of end nodes 102; and a central node 106, e.g., a central gateway and/or a base station. Via wireless communication sessions 104, instances of end node 102 communicate with central node 106, respectively. As examples (and as will be discussed in more detail below, respectively), communications (in the downlink (DL) direction) from central node 106 to instances of end node 102 can include a beacon signal. Also as an example (and as will be discussed in more detail below), communications (in the uplink (UL) direction) from an instance of end node 102 to central node 106 can include a data message. Accordingly, instances of end node 102 can be described as message-sourceable.

In terms of physical components (as illustrated by exploded view 102' in FIG. 1A), each instance of end node 102 includes: one or more instances of a processor 108; memory 110 which itself includes one or more instances of non-volatile memory 112A and one or more instances of volatile memory 112B; and a wireless unit 114'. Also, in terms of physical components (as illustrated by exploded view 106' in FIG. 1B), central node 106 includes: one or more instances of a processor 116; memory 118 which itself includes one or more instances of non-volatile memory 120A and one or more instances of volatile memory 120B; and a wireless unit 122'.

Each of wireless unit 122' and wireless unit 114' is configured to receive and transmit messages wirelessly, respectively. Overall, the physical components of central node 106 and of each instance of end node 102, respectively, are operable to engage in (among other things) half-duplex communication, e.g., based on the LoRa™ modulation format. For example, the wireless transmissions can be performed in an unlicensed spectrum. Examples of unlicensed spectrums include the industrial, scientific and medical (ISM) radio bands reserved internationally for the use of radio frequency (RF) energy for industrial, scientific and medical purposes other than telecommunications, e.g., the 915 MHz ISM band as regulated in the U.S.A. by FCC Part 15, with such regulations including requirements/constraints on frequency hopping, etc.

In terms of functional units (as illustrated by exploded view 102" in FIG. 1A), each instance of end node 102 includes: a wireless interface 114" (itself including a slotted ALOHA unit 154); a timer 140; a message generator 142; a packetizer 144; a governor 146; a logical-channel (LC) selector and a logical-channel selector 148 (itself including a physical-channel random selector 152 and a spreading factor selector 154). Also, in terms of functional units (as illustrated by exploded view 106" in FIG. 1B), central node 106 includes: a beacon signal generator 134; a time-boundary unit 136; a timer 138; and a wireless interface 122' (itself including a slotted ALOHA unit 123). For each of central node 106 and a given instance of end node 102, such functional units can be implemented at least in part, e.g., as executable code stored in one or more of the memories thereof (noted above), with such code being executable by one or more of the processors (noted above), respectively. Such implementations can conform to the communication-layer diagram of FIG. 2 (discussed below).

For example, central node 106 can be a LoRa/SYMPHONY Gateway that has, e.g., 8 physical-channels (such as Model No. LL-BST-8 commercially available from LINK LABS, LLC), and that is adaptively configured to use, e.g., LoRa orthogonal spreading factors 7, 8, 9 and 10; optionally, Model No. LL-BST-8 can be adapted to work with one or more instances of a Model SX1257 FR Front-End Transceiver commercially available from SEMTECH Corp. Here, an alternate term for physical-channel is intermediate frequency, IF. Also, here, a logical-channel refers to a combination of a physical-channel and a spreading factor (or code) used therewith. For example, for a first group of M (e.g., M=8) physical-channels in an unlicensed spectrum, respectively, and for a predefined second group of N (e.g., N=4) orthogonal spreading factors usable on each physical-channel, respectively, then there are M*N (e.g., M*N=32) of logical-channels. More generally, M and N can be non-zero, positive integers, respectively. Also, slotted ALOHA unit 154 and slotted ALOHA unit 123 each are configured to be compatible with the well-known slotted ALOHA packetized, wireless networking technique.

Figure 2:
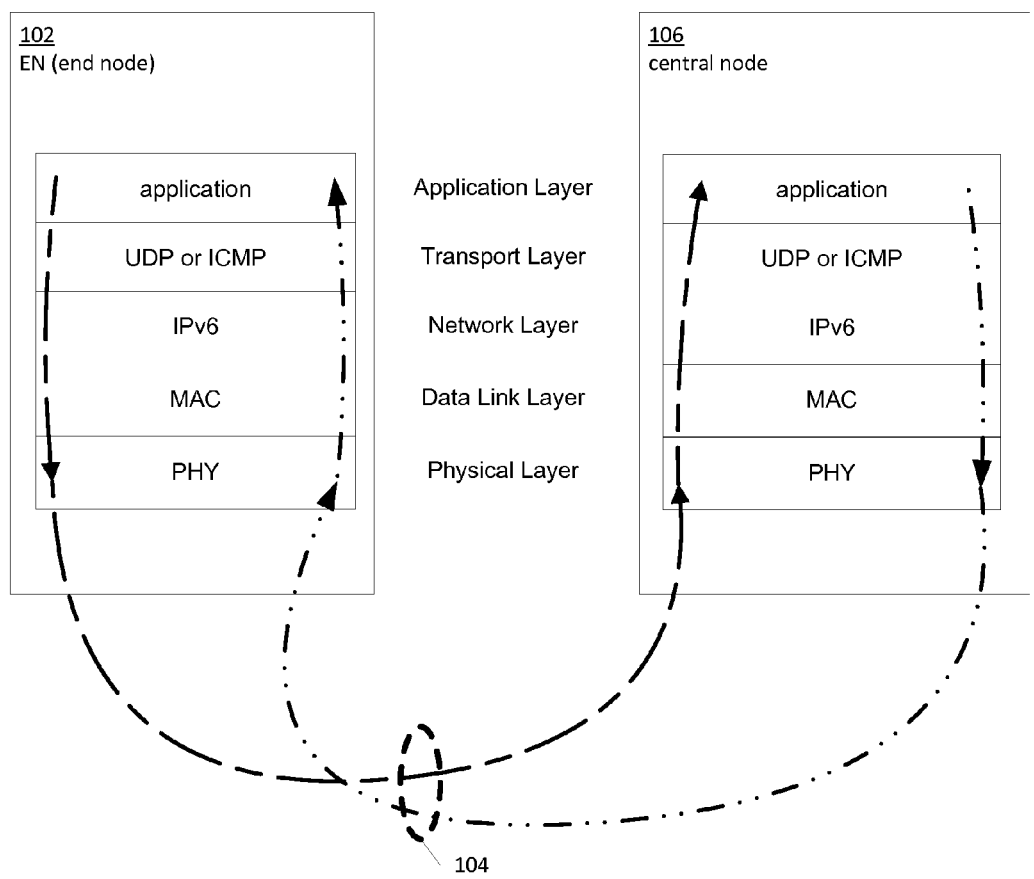
FIG. 2 is a communication-layer diagram illustrating the path of flow during an instance of a communication session between a central node and an instance of an end node, according to an embodiment of the present invention.

FIG. 2 is a communication-layer diagram illustrating the path of flow during an instance of communication session 104 between central node 106 and an instance of end node 102, according to an embodiment of the present invention.

Central node 106 and each instance of end node 102 can be implemented at least in part, e.g., as executable code stored in one or more of the noted (above) memories thereof and executed by one or more of the noted (above) processor units thereof, respectively. Such implementations can conform to the communication-layer diagram of FIG. 2.

More particularly, central node 106 and each instance of end node 102 can have a stack based (in part); on industry-standard layers. The layers illustrated in FIG. 2 represent but one example of combinations of layers that can be included in such stacks, respectively. Such layers, from bottom to top, for example (as illustrated in FIG. 2), can include: a physical layer; a data link (or MAC) layer; a network layer (e.g., an IP) layer; a transport layer (e.g., a UDP layer or ICMP layer); and an application layer. Alternatively, different combinations of layers could be used in the stack.

Briefly, in operation, an instance of end node 102 can transmit messages to central node 106 as follows. Wireless unit 114' and wireless interface 114" can be configured to half-duplex receive (in the DL direction) and half-duplex transmit (in the UL direction) messages. An instance of end node 102 (via wireless unit 114' and wireless interface 114") can receive (in the DL direction), from central node 106, a beacon signal (e.g., a non-hopping beacon signal) periodically-transmitted (e.g., at an interval of 2 sec or 0.5 Hz) from central node 106 (via wireless unit 122' and wireless interface 122").

Conversely (and, again, briefly), in operation, central node 106 can transmit (in the DL direction) a beacon signal to instances of end node 102, and then listen (in the UL direction) for messages from the instances of end node 102, respectively, as follows. Beacon signal generator 134 can be configured to generate (via wireless unit 122' and wireless interface 122") periodically (e.g., at an interval of 2 sec or 0.5 Hz) the beacon signal (e.g., a non-hopping beacon signal) For example, though the beacon signal is transmitted in an unlicensed spectrum, each beacon signal can be of sufficient bandwidth that it does not have to hop, i.e., it can be a non-hopping signal and yet be can be transmitted permissibly in the unlicensed spectrum because it is of sufficient bandwidth. That is, the beacon signal can be transmitted on a DL logical channel corresponding to a predefined physical channel and a predefined spreading factor selected from the second group of N orthogonal spreading. Here, the physical-channel and the spreading factor are predefined in the sense that central node 106 and instances of end node 102 know in advance what the physical-channel and the spreading factor will be.

More particularly regarding central node 106, wireless unit 122' and wireless interface 122" can be configured to half-duplex receive (in the UL direction) and half-duplex transmit (in the DL direction) messages. Wireless interface 122" can be configured to transmit (in the DL direction, via wireless unit 122') the beacon signal to the instances of end node 102, thereby starting an elapse of time corresponding to the frame.

Each beacon signal can denote the start of a single frame. For example, all frames having a fixed length/duration, e.g., 2 seconds. Each frame can be organized to include a downlink (DL) phase which precedes an uplink (UL) phase. For example, there could be one DL phase followed by one UL phase. Alternatively, there could be one or more DL phases with one or more UL phases of which the first UL phase begins after the last DL phase ends. A payload of each beacon signal includes an offset representing a starting time of the UL phase. The offset is adaptively set by central node 106.

During the DL phase, central node 102 can transmit not only the beacon signal (which itself is an example of a DL signal), but non-beacon DL signals/messages as well, e.g., configuration signals which indicate one or more values of one or more communication parameters, etc. Central node 102 will not necessarily transmit a non-beacon signal during each frame; rather, central node 102 can, but is not required to, transmit one or more non-beacon signals during each frame.

Such non-beacon DL signals can be of different durations, respectively. Depending upon which and how many non-beacon DL signals central node 102 'wishes' to generate and send during the DL phase, the duration, $T_{DL-WISH}$, needed for sending the wish list will vary. Not all sizes of $T_{DL-WISH}$, however, can be accommodated because the DL phase has a maximum permissible duration, $T_{DL-MAX}$.

If the sum of the duration, $T_{DL-WISH}$, of all of the messages included on a 'full DL wish list' plus the beacon signal duration is less than or equal to the maximum DL duration, i.e., if $(T_{BEACON}+T_{DL-WISH}) \leq T_{DL-MAX}$, then all of the non-beacon DL signals included on the full DL wish list will be transmitted during the DL phase. In this case, time-boundary unit 136 can be configured to set an actual duration, $T_{ACTUAL}$, of the DL phase to be equal to the sum of the beacon signal duration plus the full DL wish list duration, i.e., $T_{ACTUAL}=(T_{BEACON}+T_{DL-WISH}) \leq T_{DL-MAX}$.

However, if the maximum signal duration is less than the sum of the beacon signal duration and the full DL wish list duration, i.e., if $T_{DL-MAX}<(T_{BEACON}+T_{DL-WISH})$, then time-boundary unit 136 can be configured to truncate the wish list such that: a duration of the truncated DL wish list, $T_{DL-TRUNC}$, of all of the messages included on a 'truncated DL wish list' is less than $T_{DL-WISH}$, i.e., $T_{DL-TRUNC} \leq T_{DL-WISH}$; and the sum of the truncated DL wish list duration and the beacon signal duration will be less than or equal to the maximum duration, i.e., $(T_{BEACON}+T_{DL-TRUNC}) \leq T_{DL-MAX}$. In this case, time-boundary unit 136 can be configured to set the actual duration of the DL phase to be equal to the sum of the beacon signal duration plus the truncated DL wish list duration, i.e., $T_{ACTUAL}=(T_{BEACON}+T_{DL-TRUNC}) \leq T_{DL-MAX}$.

During the DL phase, wireless unit 122' and wireless interface 122" are configured for half-duplex transmission. Based on the offset, timer 138 can be configured to elapse a delay time based on the offset and thereby then indicate a start of the UL phase. It is noted that wireless unit 122' and wireless interface 122" do not use the slotted ALOHA technique in the DL phase.

At the start of the UL phase-start, wireless unit 122' and wireless interface 122" are further configured to change operation to half-duplex reception and to begin listening as follows: on each of M*N of UL logical-channels (again, resulting from the predefined first group of M physical-channels, respectively, and the predefined second group of N orthogonal spreading factors usable on each physical-channel, respectively); and for one or more messages transmitted from the instances of end node 102, respectively. Here, the first group of M physical-channels and the second group of N orthogonal spreading factors are predefined in the sense that central node 106 and instances of end node 102 know in advance what they are, respectively. It is noted that wireless unit 122' and wireless interface 122" are configured to listen (during the UL phase) in expectation of the possibility of receiving at least partial messages (that is, at least some packets comprising one or more messages, respectively) which have been transmitted according to the slotted ALOHA technique (during the DL phase).

Earlier, as an example of how to implement central node 106, Model No. LL-BST-8 (commercially available from LINK LABS, LLC) was mentioned. Extending that example, Model No. LL-BST-8 includes 32 detectors that can listen simultaneously on 32 logical-channels (e.g., where 32=M*N for M=8 physical-channels and N=4 spreading factors, e.g., LoRa spreading factors 7, 8, 9, 10) for the presence of one or more signals from one or more instances of end node 102, respectively. Such signals include a preamble. In particular, the detectors listen for the preambles of the signals. It is noted that the preambles are different for each spreading factor, respectively. Model No. LL-BST-8 additionally includes 8 demodulators. Upon sensing a signal on a logical-channel, one of the 8 demodulators is adaptively set to the physical-channel and spreading factor corresponding to the logical-channel (and thereby the slot size is adaptively set). It is relatively unlikely that more than 8 signals would be received concurrently. If, e.g., 9 signals were to be received concurrently, then the ninth instance of end-node 102 which sourced the ninth signal would not receive an acknowledgement signal from central node 106. If there is a relatively higher priority associated with receipt of the ninth signal, e.g., if the ninth signal has a requested a receipt-acknowledgment, then the ninth-signal-sourcing instance of end node 102 is likely to attempt to retransmit the ninth signal (e.g., at the next slot corresponding to the logical-channel being used). Alternatively, if there is a relatively lower priority associated with receipt of the ninth signal, e.g., if the ninth signal did not request a receipt-acknowledgment, then the ninth-signal-sourcing instance of end node 102 may not attempt to retransmit the ninth signal.

More particularly regarding instances of end node 102, wireless unit 114' and wireless interface 114" can be configured to half-duplex receive (in the DL direction during the DL phase) and half-duplex transmit (in the UL direction during the UL phase) messages. In the DL direction, such messages include at least the beacon signal, and may also include one or more non-beacon DL signals.

Figure 3:
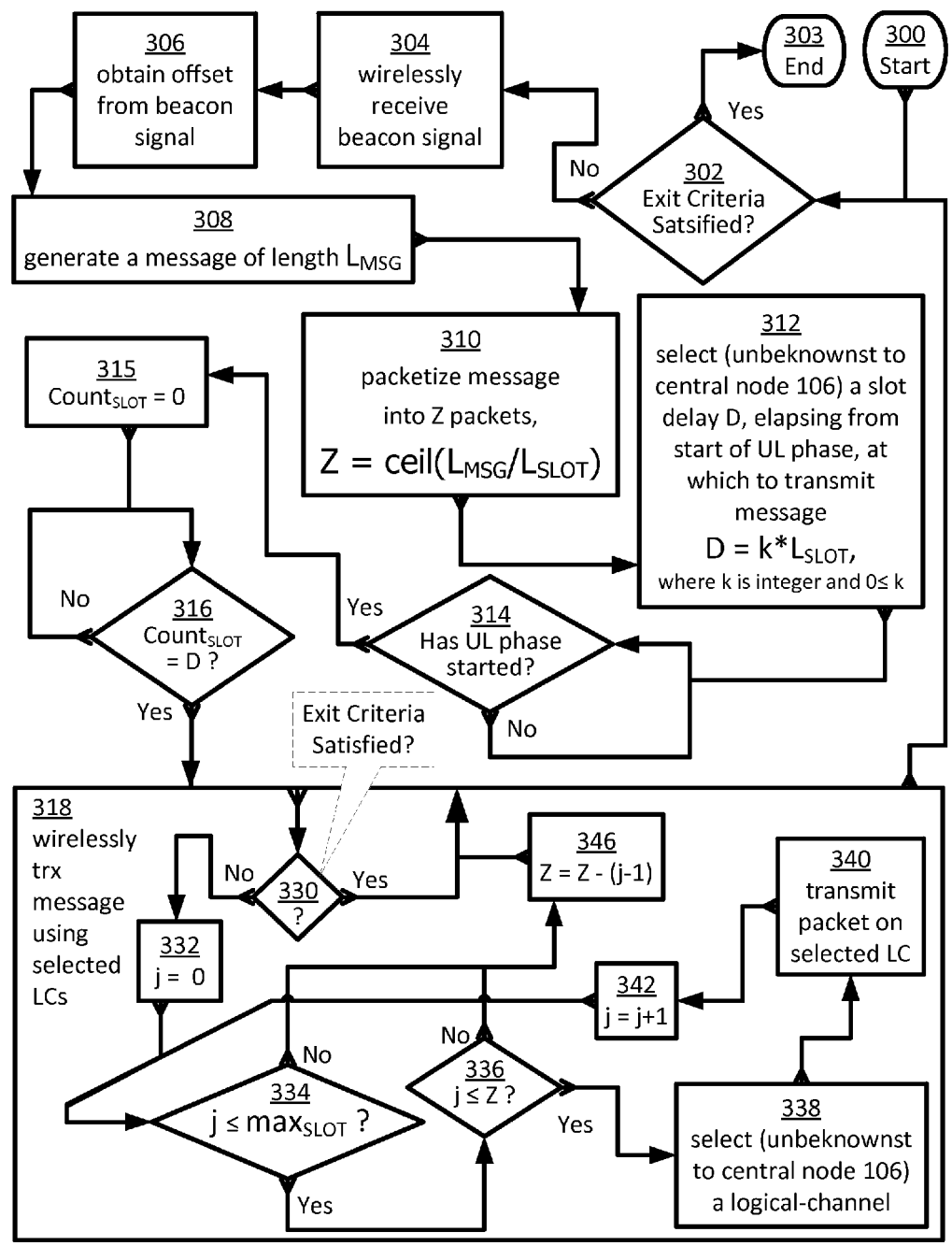
FIG. 3 is a flowchart illustrating a method of operating one instance of the end node to wirelessly communicate with the central node, e.g., over an unlicensed spectrum, according to an embodiment of the present invention.

FIG. 3 is a flowchart illustrating a method of operating one instance of end node 102 to wirelessly communicate with central node 106, e.g., over an unlicensed spectrum, according to an embodiment of the present invention.

In FIG. 3, there is a loop. As the beacon signal is generated periodically by central node 106, so too is the outermost/main loop of FIG. 3 dependently iterated periodically. As a general design consideration, no loop should be infinite, i.e., inescapable. Accordingly, flow in FIG. 3 starts at block 300 and proceeds to a decision block 302, where processor 108 decides if any exit criteria have been satisfied. If the outcome of decision block 302 is yes (one or more of the exit criteria are satisfied), then flow proceeds to block 303 and ends. If the outcome of decision block 302 is no (none of the exit criteria has been satisfied), then flow proceeds to a block 304.

At block 304, the instance of end node 102, more particularly, wireless IF 114" (via wireless unit 114') receives a beacon signal from central node 106. From block 304, flow proceeds to a block 306, where wireless IF 114" obtains the offset from the beacon signal and provides it (among other things) to timer 140 and LC selector 142. Timer 140 is configured to elapse a delay time based on the offset and thereby then indicate a start of the UL phase to slotted ALOHA unit 154 (and thus to wireless IF 114"). From block 306, flow proceeds to a block 308.

At block 308, message generator 142 generates a message to be sent by the instance of end node 102. From block 308, flow proceeds to a block 310. At block 310, packetizer 346 packetizes the message according to a slot size common to a predefined first group of M spreading factors used by wireless IF 114", respectively, thereby yielding one or more packets, with M being a non-zero, positive integer. While the slot size is common, the different spreading factors represent different slotting schemes, respectively. The different spreading factors use different amounts of slots to represent a given packetized message. In other words, the different spreading factors represent different data rates. Because the slot size is common to the first group of M spreading factors, the message can be packetized before spreading factors are chosen for the resulting packets, respectively.

Here, for each slot, it is assumed that one packet (at most) is transmitted by the instance of end node 102. In particular, packetizer 346 is configured to decompose the message into Z packets such that $$Z = \text{ceil}\left(\frac{L_{MSG}}{L_{SLOT}}\right) = \left\lceil \frac{L_{MSG}}{L_{SLOT}} \right\rceil;$$

with:
Z being a positive integer;
the notations, ceil ( ), denotes the ceiling function;
$L_{MSG}$ is a length of the message; and
$L_{SLOT}$ is a length of the slot size.
From block 310, flow proceeds to a block 312.

At block 312, slotted ALOHA unit 154 selects (unbeknownst to central node 106) a slot delay D, elapsing from the start of UL phase, at which to transmit message, such that $$D=k*L_{SLOT},$$

where k is an integer and 0≤k. In other words, slotted ALOHA unit 154 can begin transmitting at the first available slot when the UL phase starts, or it can delay the start of the transmission until the elapse of one or more slots. From block 312, flow proceeds to a block 314.

Though central node 106 knows that it is possible that instances of end node 102 could transmit messages during the UL phase, central node 106 does not know in advance when instances of end node 102 will transmit messages (if at all) during the UL phase. Such transmissions could occur at or after the UL phase-start. Hence, central node 106 listens on all M*N possible logical-channels throughout the UL phase. From block 312, flow proceeds to a decision block 314.

At decision block 314, timer 140 determines if the UL phase has started. If the outcome of decision block 314 is no (the UL phase has not started), then flow loops back to the input of decision block 314, i.e., the instance of end node 102 waits. If the outcome of decision block 314 is yes (the UL phase has started), then flow proceeds to a block 315.

At block 315, slotted ALOHA unit 154 resets a count ($Count_{SLOT}$) to zero such that $Count_{SLOT}=0$. From block 315, flow proceeds to a decision block 316. At decision block 316, slotted ALOHA unit 154 determines if D slots have elapsed, i.e., if $Count_{SLOT}=D$? If the outcome of decision block 316 is no ($Count_{SLOT}\neq D$), then flow loops back to the input of decision block 316, i.e., the instance of end node 102 waits. If the outcome of decision block 316 is yes ($Count_{SLOT}=D$), then flow proceeds to a block 318.

At block 318, wireless IF 114" (via slotted ALOHA unit 154 and via wireless unit 114') transmits at least a portion of the message using selected UL logical-channel according to a slotted ALOHA technique. From block 318, flow loops back to decision block 302, discussed above.

Block 318 itself is a loop. As a general design consideration, no loop should be infinite, i.e., inescapable. Accordingly, flow in block 318 proceeds to a decision block 330, where processor 108 decides if any exit criteria have been satisfied. If the outcome of decision block 330 is yes (one or more of the exit criteria are satisfied), then flow proceeds to exit block 318 and proceed to decision block 302, discussed above. If the outcome of decision block 330 is no (none of the exit criteria has been satisfied), then flow proceeds to a block 32.

At block 332, governor 136 sets a loop-counter, j, to zero, i.e., j=0. Each iteration of loop 318 (except for the last iteration) will result in the transmission of one of the number of packets Z into which the message has been decomposed, with sequential iterations of block 332 using different logical-channels for the respective transmissions. From block 332, flow proceeds to a decision block 334. At decision block 334, governor 136 determines if the loop counter j is less than or equal to a maximum number of slots, $\max_{SLOT}$, that can be used by the instance of end node 102 during the frame, i.e., if j≤$\max_{SLOT}$. The value of $\max_{SLOT}$, for example, can be based on the quality of service (QOS) for which the instance of end node 102 is subscribed.

If the outcome of decision block 334 is no ($\max_{SLOT}<j$), then flow proceeds to a block 346 (discussed below). If the outcome of decision block 334 is yes (j≤$\max_{SLOT}$), then flow proceeds to a decision block 336.

At decision block 336, governor 136 determines if the loop counter j is less than or equal to the number of packets Z into which the message has been decomposed, i.e. if j≤Z). If the outcome of decision block 336 is no (Z<j), then flow proceeds to block 346 (again, discussed below). If the outcome of decision block 336 is yes (j≤Z), then flow proceeds to a block 338.

At block 338, logical-channel (LC) selector 148 selects a logical-channel to be used for transmitting the $j^{th}$ one of the Z packets (into which the message has been decomposed) during the slot corresponding to the $j^{th}$ iteration of loop 318. More particularly, the selected logical-channel is determined according to a selection by spreading factor selector 152 of one amongst the predefined first group of M spreading factors and according to a random selection by physical-channel selector 150 of one amongst a predefined second group of N physical-channels, respectively, with N being a non-zero, positive integer.

Spreading factor selector 152 can be configured to select the spreading factor, for example, based on striking a balance/compromise between competing performance goals, e.g., including a first performance goal of reducing (if not minimizing) energy consumption related to transmission of messages and a second performance goal of achieving a desired likelihood that a transmitted message will be received by the recipient node (e.g., central node 106). In general, use of a smaller spreading factor results in transmission at a higher data rate (due to lesser redundancy in terms of bits transmitted) which consumes less energy for transmission but is associated with a smaller likelihood of successful message reception. In contrast (and in general), use of a larger spreading factor results in transmission at a lower data rate (due to greater redundancy in terms of bits transmitted) which consumes more energy for transmission but is associated with a greater likelihood of successful message reception. Among other things, technology for selecting a spreading factor is disclosed in copending U.S. patent application Ser. No. 14/701,564, filed May 1, 2015, and entitled "Adaptive Transmission Energy Consumption," the entirety of which is hereby incorporated by reference.

Typically, though not necessarily, loop 318 is iterated on a one-for-one basis with the elapse of slots during the UL phase. Alternatively, slotted ALOHA unit 154 can be configured to skip one or more available slots, either deterministically or randomly. From block 338, flow proceeds to a block 340.

At block 340, wireless IF 114" (via slotted ALOHA unit 154 and via wireless unit 114') transmits the $j^{th}$ one of the Z packets. From block 340, flow proceeds to a bock 342. At block 342, governor 136 increments the loop-counter, i.e., j=J=1. From block 342, flow loops back to decision block 334, discussed above.

As noted above, flow can proceed to block 345 from either of decision blocks 334 and 336. At block 346, governor 136 updates Z to reflect how many packets (j) were transmitted during the UL phase, i.e., sets Z equal to Z minus J (Z=Z−j). If the result of block 346 is that Z=0, then the instance of end node 102 will have finished transmitting all of the packets (into which the message has been decomposed) during the frame. If, however, the result of block 346 is that 0<Z, then the instance of end node 102 will not have finished transmitting all of the packets (into which the message has been decomposed) during the frame, and so will attempt to finish sending the remaining Z packets during one or more successive frames, respectively.

Figure 4:
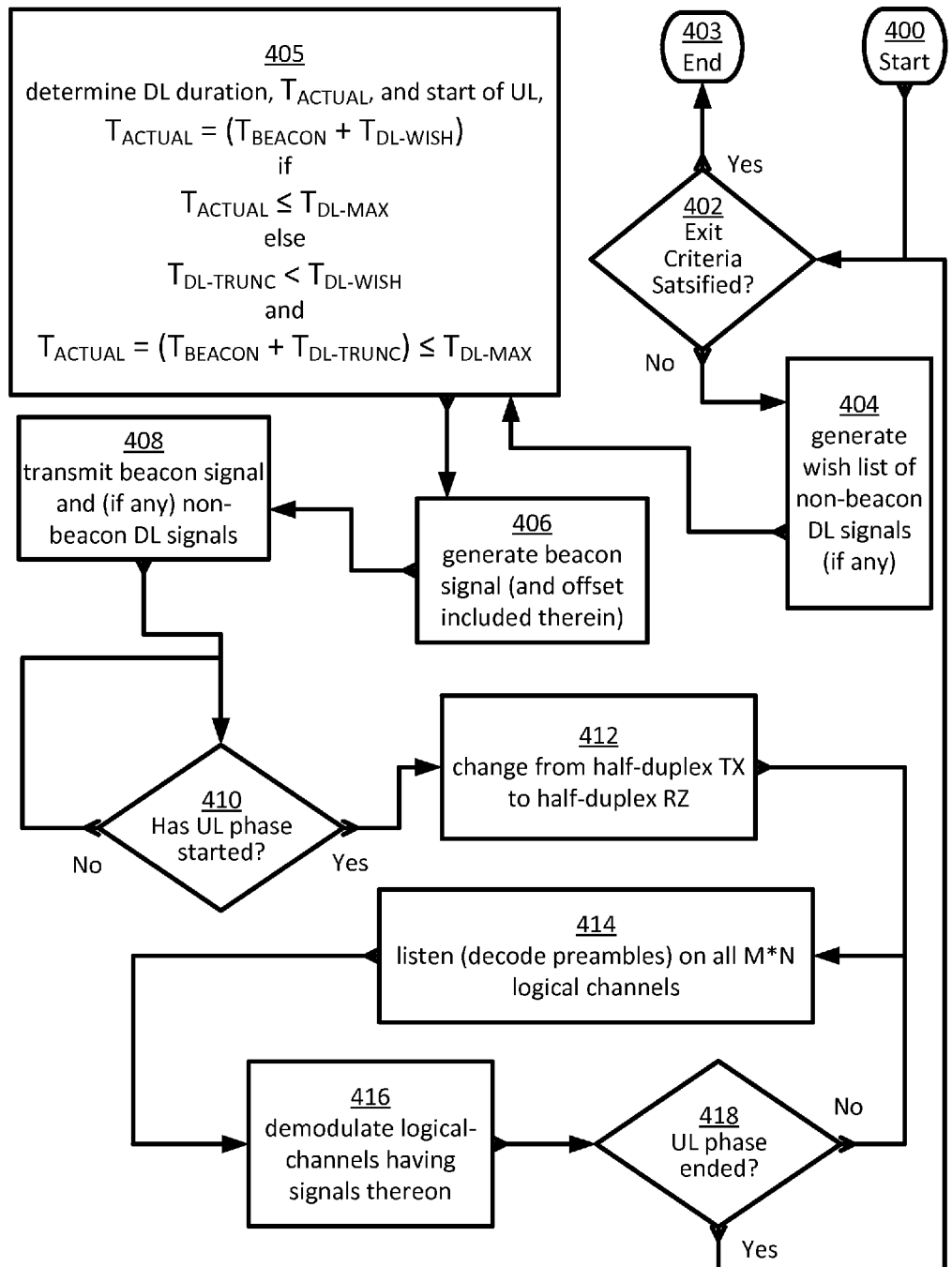
FIG. 4 is a flowchart illustrating a method of operating the central node to wirelessly communicate with instances of the end node, e.g., over an unlicensed spectrum, according to an embodiment of the present invention.

FIG. 4 is a flowchart illustrating a method of operating central node 106 to wirelessly communicate with instances of end node 102, e.g., over an unlicensed spectrum, according to an embodiment of the present invention.

In FIG. 4, there is a loop. The outermost/main loop of FIG. 4 corresponds to the periodic generation of the beacon signal, hence the outermost/main loop of FIG. 4 is iterated periodically. As a general design consideration, no loop should be infinite, i.e., inescapable. Accordingly, flow in FIG. 4 starts at block 400 and proceeds to a decision block 402, where processor 108 decides if any exit criteria have been satisfied. If the outcome of decision block 402 is yes (one or more of the exit criteria are satisfied), then flow proceeds to block 403 and ends. If the outcome of decision block 402 is no (none of the exit criteria has been satisfied), then flow proceeds to a block 404.

At block 404, central node 106, more particularly, time-boundary unit 136, generates a wish list of non-beacon DL signals (if any) to be transmitted during the frame. From block 404, flow proceeds to a block 405. At block 405, time-boundary unit 136 adaptively determines a duration ($T_{ACTUAL}$) of the DL phase and a start of the UL phase, which time-boundary unit 136 can represent, e.g., with the offset. Time-boundary unit 136 provides the offset to beacon-signal generator 134 and timer 138.

In particular, time-boundary unit 136 determines the actual duration of the DL phase ($T_{ACTUAL}$) to be equal to the sum of the duration of the beacon signal ($T_{BEACON}$) and a cumulative duration ($T_{DL\text{-}WISH}$) of the non-beacon signals included in the full wish list if the DL phase duration will be less than or equal to the maximum permissible duration of the DL phase ($T_{DL\text{-}MAX}$), i.e., set $T_{ACTUAL}=(T_{BEACON}+T_{DL\text{-}WISH})$ if $T_{ACTUAL} \le T_{DL\text{-}MAX}$. Else if the beacon signal duration and the cumulative duration of the full wish list will be greater than the maximum permissible duration, i.e., if $T_{DL\text{-}MAX}<T_{ACTUAL}=(T_{BEACON}+T_{DL\text{-}WISH})$, then time-boundary unit 136 is configured to truncate the wish list such that the sum of the beacon signal duration and the cumulative duration of the truncated wish list, i.e., $T_{DL\text{-}TRUNC}<T_{DL\text{-}WISH}$ and $T_{ACTUAL}=(T_{BEACON}+T_{DL\text{-}TRUNC}) \le T_{DL\text{-}MAX}$. From block 405, flow proceeds to a block 406. At block 406, beacon-signal generator 134 generates the beacon signal and includes therein the offset. From block 406, flow proceeds to a block 408.

At block 408, wireless IF 122" (via wireless unit 122') transmits the beacon signal and (possibly) other non-beacon DL signals (if any of the latter) to instances of end node 102. From block 408, flow proceeds to a block 410.

At decision block 410, timer 138 determines if the UL phase has started. If the outcome of decision block 410 is no (the UL phase has not started), then flow loops back to the input of decision block 410, i.e., central node 106 waits. If the outcome of decision block 410 is yes (the UL phase has started), then flow proceeds to a block 412.

At block 412, wireless IF 122" and wireless unit 122' change from half-duplex transmission operation to half-duplex reception operation. From block 412, flow proceeds to a block 414. At block 414, wireless IF 122" (via wireless unit 122') begins to listen (decode signal preambles) as follows: on each of the M*N logical-channels used for the UL phase (and which result from a predefined first group of M physical-channels, respectively, and a predefined second group of N orthogonal spreading factors usable on each physical-channel, respectively); and for one or more messages transmitted from the end node, respectively. From block 414, flow proceeds to a block 416.

At block 416, wireless IF 122" (via wireless unit 122') demodulate signals on logical-channels which were determined to have signals present thereof via the listening of block 414. From block 416, flow proceeds to a decision block 418, where timer 138 determines if the UL phase has ended. If the outcome of decision block 418 is no (the UL phase has not ended), then flow loops back to the input of block 414, i.e., central node 106 waits. If the outcome of decision block 418 is yes (the UL phase has ended), then flow loops back to decision block 402, discussed above.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of the embodiments explicitly discussed herein, those skilled in the art will appreciate that the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto.

Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method of operating an end node to communicate with a central node, the method comprising:
    wirelessly receiving, a beacon signal periodically-transmitted from the central node;
        each beacon signal denoting the start of a single frame;
        each frame being organized to include a downlink (DL) phase which precedes an uplink (UL) phase; and
        a payload of the beacon signal including an offset which represents a starting time of the UL phase;
    generating a message;
    selecting, unbeknownst to the central node, at least one UL logical-channel, respectively; and
    wirelessly transmitting, during the UL phase, at least a portion of the message from the end node over the selected at least one UL logical-channel according to a slotted ALOHA technique,
    wherein the wirelessly transmitting includes:
    packetizing the message according to a slot size common to a predefined first group of M orthogonal spreading factors, respectively, thereby yielding one or more packets, with M being a non-zero, positive integer; and
    awaiting, based on the offset, a start of the UL phase; and
    sending, during the UL phrase, at least one of the one or more packets as the at least a portion of the message.

2. The method of claim 1, wherein:
    the selecting the at least one UL logical-channel includes:
        selecting one amongst the first group of M orthogonal spreading factors; and
        randomly selecting one amongst a predefined second group of N physical-channels, respectively, with N being a non-zero, positive integer; and
    the sending includes:
        using the selected at least one UL logical-channel corresponding to the one or more packets, respectively.

3. The method of claim 1, wherein:
    the packetizing includes:
        decomposing the message into Z packets such that $$Z = \mathrm{ceil}\left(\frac{L_{MSG}}{L_{SLOT}}\right) = \left\lceil \frac{L_{MSG}}{L_{SLOT}} \right\rceil;$$

with:
        Z being a positive integer;
        $L_{MSG}$ is a length of the message; and
        $L_{SLTO}$ is a length of the slot size; and
    the sending, during the frame, of the at least one packet includes:
        transmitting the Z packets if $Z \leq \max_{SLOT}$; or else
        transmitting $\max_{SLOT}$ ones of the Z packets if $\max_{SLOT} < Z$;
    with:
        the $\max_{SLOT}$ being a maximum number of slots which can be used for transmitting the at least a portion of the message during the frame.

4. The method of claim 1, wherein:
    the wirelessly receiving is performed in half-duplex; and
    the wireless transmitting is performed in half-duplex.

5. The method of claim 1, wherein:
    the beacon signal is wirelessly received on a DL logical-channel corresponding to a predefined physical channel and a predefined spreading factor; and
    the physical channel has a sufficiently wide bandwidth such that the beacon signal is exempted from a frequency-hopping requirement.

6. The method of claim 1, wherein:
    the wirelessly transmitting uses an unlicensed spectrum.

7. The method of claim 1, wherein:
    each of the wirelessly receiving and the wirelessly transmitting is performed according to a low-power, low-bandwidth modulation format.

8. An end node configured to communicate with a central node, the end node comprising:
    a wireless transceiver configured to receive and transmit messages, respectively;
    a memory; and
    one or more processors operatively connected with the wireless transceiver, and configured to execute contents of the memory comprising
        a wireless interface configured to receive, via the wireless transceiver, a beacon signal periodically-transmitted from the central node;
            each beacon signal denoting the start of a single frame;
            each frame being organized to include a downlink (DL) phase which precedes an uplink (UL) phase; and
            a payload of the beacon signal including an offset which represents a starting time of the UL phase;
        a message generator configured to generate a message;
        a logical-channel (LC) selector configured to select, unbeknownst to the central node, at least one UL logical-channel, respectively;
        a timer configured to elapse a delay time based on the offset and thereby then indicate a start of the UL phase; and
        a packetizer configured to packetize the message according to a slot size common to a predefined first group of M spreading factors, respectively, thereby yielding one or more packets, with M being a non-zero, positive integer;

wherein the wireless interface is further configured to await, based on the offset, the start of the UL phase; and transmit, during the UL phase, at least a portion of the message over the selected at least one UL logical-channel according to a slotted ALOHA technique;

in which at least one of the one or more packets is transmitted as the at least a portion of the message.

9. The end node of claim 8, wherein:
the LC selector is further configured to select the at least one UL logical-channel on a per-packet basis by:
selecting one amongst the first group of M orthogonal spreading factors; and
randomly selecting one amongst a predefined second group of N physical-channels, respectively, with N being a non-zero, positive integer; and
the wireless interface is further configured to:
use the selected at least one UL logical-channel corresponding to the one or more packets, respectively.

10. The end node of claim 8, wherein:
the packetizer is further configured to:
decompose the message into Z packets such that $$Z = \text{ceil}\left(\frac{L_{MSG}}{L_{SLOT}}\right) = \left\lceil \frac{L_{MSG}}{L_{SLOT}} \right\rceil;$$

with:
Z being a positive integer;
$L_{MSG}$ is a length of the message; and
$L_{SLOT}$ is a length of the slot size; and
the end node further comprises:
a governor configured to limit how many packets are sent during the frame by at least:
permitting transmission of the Z packets if $Z \leq \max_{SLOT}$; or else
permitting transmission of $\max_{SLOT}$ ones of the Z packets if $\max_{SLOT} < Z$;
with the $\max_{SLOT}$ being a maximum number of slots which can be used for transmitting the at least a portion of the message during the frame.

11. The end node of claim 8, wherein the wireless interface is further configured to:
wirelessly receive, via the wireless transceiver, in half-duplex; and
wirelessly transmit, via the wireless transceiver, in half-duplex.

12. The end node of claim 8, wherein:
the wireless interface, via the wireless transceiver, is further configured to wirelessly receive the beacon signal on a DL logical-channel corresponding to a predefined physical channel and a predefined spreading factor selected from a second group of N orthogonal spreading factors; and
the physical channel has a sufficiently wide bandwidth such that the beacon signal is exempted from a frequency-hopping requirement.

13. The end node of claim 8, wherein:
the wireless interface, via the wireless transceiver, is further configured to use an unlicensed spectrum.

14. The end node of claim 8, wherein:
the wireless interface, via the wireless transceiver, is further configured to wirelessly receive and to wirelessly transmit according to a low-power, low-bandwidth modulation format.

15. A method of operating a central node to wirelessly communicate with an end node, the method comprising:
generating periodically a beacon signal;
each beacon signal denoting the start of a single frame; and
each frame being organized to include a downlink (DL) phase which precedes an uplink (UL) phase;
adaptively determining a duration of the DL phase and a start of the UL phase;
configuring the beacon signal with a payload which includes:
an offset indicating when the UL phase will begin;
wirelessly transmitting periodically the beacon signal;
awaiting a start of the UL phase based on the offset; and
wirelessly listening, beginning at the UL phase-start, as follows:
on each of M*N UL logical-channels resulting from a predefined first group of M physical-channels, respectively, and a predefined second group of N orthogonal spreading factors usable on each physical-channel, respectively; and
for one or more messages transmitted from the end node, respectively, according to a slotted ALOHA technique;
wherein M and N are non-zero, positive integers, respectively.

16. The method of claim 15, wherein:
the transmitting is performed in half-duplex; and
the listening is performed in half-duplex.

17. The method of claim 15, wherein:
the transmitting periodically of the beacon signal is performed on a logical DL channel corresponding to a predefined physical channel and a predefined spreading factor selected from the second group of N orthogonal spreading factors; and
the physical channel has a sufficiently wide bandwidth such that the beacon signal is exempted from a frequency-hopping requirement.

18. The method of claim 15, wherein:
the method further comprises:
generating, as needed, a DL wish list including one or more non-beacon signals;
wirelessly transmitting at least some of the DL wish list;
a duration of the beacon signal is $T_{BEACON}$;
a maximum duration of the DL phase is $T_{DL-MAX}$;
the adaptively determining the duration of the DL phase includes:
determining whether to send, in addition to the beacon signal, a full DL wish list or a truncated DL wish list; and
the configuring the beacon signal with a payload includes:
determining the offset based on:
a cumulative duration of the full DL wish list ($T_{DL-WISH}$) if an actual duration ($T_{ACTUAL}$) of the DL phase is less than or equal to the maximum duration of the DL phase such that $T_{ACTUAL} = (T_{BEACON} + T_{DL-WISH}) \leq T_{DL-MAX}$; or else
a duration of the truncated DL wish list ($T_{DL-TRUNC}$) where $T_{DL-TRUNC} < T_{DL-WISH}$ and $T_{ACTUAL} = (T_{BEACON} + T_{DL-TRUNC}) \leq T_{DL-MAX}$.

19. The method of claim 15, wherein:
the first group of M physical-channels is located in an unlicensed spectrum.

20. The method of claim 15, wherein:
   each of the wirelessly transmitting and the wirelessly receiving is performed according to a low-power, low-bandwidth modulation format.

21. A central node configured to wirelessly communicate with an end node, the central node comprising:
   a wireless transceiver configured to at least receive and transmit messages, respectively;
   a memory; and
   one or more processors operatively connected with the wireless transceiver, and configured to execute contents of the memory comprising
      a beacon-signal generator configured to generate periodically a non-hopping beacon signal;
         each beacon signal denoting the start of a single frame; and
         each frame being organized to include a downlink (DL) phase which precedes an uplink (UL) phase;
      a time-boundary determiner configured to adaptively determine a duration of the DL phase and a start of the UL phase;
      the beacon-signal generator being further configured to include, in a payload of the beacon signal, an offset indicating when the UL phase will begin;
      a wireless interface configured to transmit periodically, via the wireless transceiver, the beacon signal; and
      a timer configured to elapse a delay time based on the offset and thereby then indicate a start of the UL phase;
      the wireless interface being further configured to listen, via the wireless transceiver and beginning at the UL phase-start, as follows:
         on each of M*N UL logical-channels resulting from a predefined first group of M physical-channels, respectively, and a predefined second group of N orthogonal spreading factors usable on each physical-channel, respectively; and
         for one or more messages transmitted from the end node, respectively, according to a slotted ALOHA technique;
   wherein M and N are non-zero, positive integers, respectively.

22. The central node of claim 21, wherein:
   the wireless interface being further configured to:
      wirelessly receive via the wireless transceiver, in half-duplex; and
      wirelessly transmit via the wireless transceiver, in half-duplex.

23. The central node of claim 21, wherein:
   the wireless interface, via the wireless transceiver, is further configured to wirelessly transmit the beacon signal on a DL logical channel corresponding to a predefined physical channel and a predefined spreading factor selected from the second group of N orthogonal spreading factors; and
   the physical channel has a sufficiently wide bandwidth such that the beacon signal is exempted from a frequency-hopping requirement.

24. The central node of claim 21, wherein:
   the central node further comprises:
      a non-beacon-signal generator configured to:
         generate, as needed, a DL wish list including one or more non-beacon signals;
   the wireless interface is further configured to transmit at least some of the DL wish list;
   a duration of the beacon signal is $T_{BEACON}$;
   a maximum duration of the DL phase is $T_{DL-MAX}$; and
   the time-boundary determiner is further configured to:
      determine whether to send, in addition to the beacon signal, a full DL wish list or a truncated wish list of non-beacon signals; and
      determine the offset based on:
         a duration of the full DL wish list, $T_{DL-WISH}$, if an actual duration, $T_{ACTUAL}$, of the DL phase is less than or equal to the maximum duration of the DL phase such that $T_{ACTUAL} = (T_{BEACON} + T_{DL-WISH}) \leq T_{DL-MAX}$; or else
         a duration of the truncated DL wish list, $T_{DL-TRUNC}$, where $T_{DL-TRUNC} < T_{DL-WISH}$ and $T_{ACTUAL} = (T_{BEACON} + T_{DL-TRUNC}) \leq T_{DL-MAX}$.

25. The central node of claim 21, wherein:
   the first group of M physical-channels is located in an unlicensed spectrum.

26. The end node of claim 21, wherein:
   the wireless interface, via the wireless transceiver, is further configured to wirelessly receive and to wirelessly transmit according to a low-power, low-bandwidth modulation format.

* * * * *